March 17, 1970      M. J. RYAN      3,501,012
APPARATUS FOR CONTINUOUS HIGH FILTRATION WITH A FILTER
Filed March 18, 1968
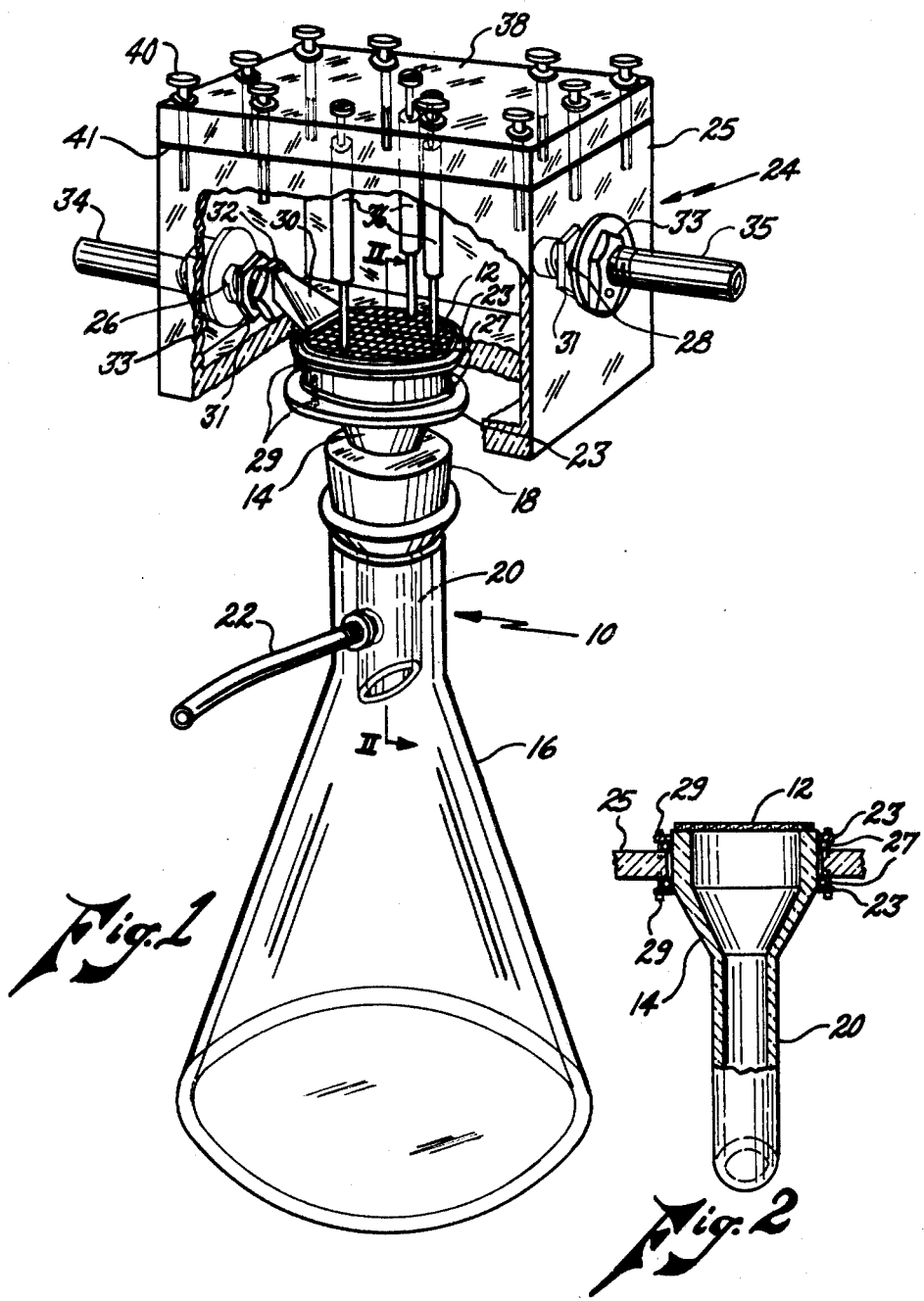
INVENTOR.
MICHAEL J. RYAN
BY Harry A. Herbert Jr.
Jacob N. Erlich and
ATTORNEYS

United States Patent Office 3,501,012
Patented Mar. 17, 1970

3,501,012
APPARATUS FOR CONTINUOUS HIGH FILTRATION WITH A FILTER
Michael J. Ryan, U.S. Air Force
(824 USAF Disp., APO, San Francisco, Calif. 96239)
Filed Mar. 18, 1968, Ser. No. 713,574
Int. Cl. B01d 35/22, 35/02
U.S. Cl. 210—406                    5 Claims

ABSTRACT OF THE DISCLOSURE

An apparatus for continuous high filtration with a Millipore filter having a box which has a nozzle therein and mounted on a filter head; the nozzle directing an incoming solution into a tangential flow pattern with an increased velocity across the filter so as to simultaneously supply the new mixture to be filtered as well as washing the filter clean of any collected material on the surface.

Background of the invention

This invention relates generally to filters and more particularly to an apparatus for continuous high filtration with a Millipore filter.

Currently, the separation of suspended matter from solution, the clarification of a liquid, or the dewatering of solids is generally accomplished by gravity settling, or by the centrifugation. In gravity settling solid particles can be removed from liquids merely by allowing the liquid to stand quietly in a settling tank. The smaller the solid particle, the longer the time required for complete clarification. This method of filtration is extremely slow and is limited to heavier suspended solids. Centrifugation, in which centrifugal force replaces the gravitational force, reduces the time of settling from hours to minutes. This process, however, must be carried out on a "batch" basis and at high r.p.m.'s. It cannot be carried out for high filtration continuously with any great deal of efficiency.

A new method available is to use Millipore filtration via a vacuum. The Millipore filters make microseparations with a degree of precision never before possible. In microanalysis they have become important, and often standard tools for the identification of particular matter, bacteria, and cells in liquids and gases used in many areas of science and industry. Particle counts in aerospace cleanrooms and for missile hydraulic fluids, gravimetric analyses of aviation fuels, culturing of microorganisms from water and food products, and the examination of body fluids for cancer cells are typical analytical applications.

In microfiltration they are widely used for cleaning water, solvents, and other fluids in critical industrial processes and systems, for sterilizing pharmaceutical and biological solutions, and for achieving biological and colloidal stability in beverages and other liquid food products.

Millipore filters are made from a variety of polymer systems, in more than twenty pore-size grades to provide a wide range of retention, solubility, temperature resistance, and strength characteristics. The Millipore filter is highly desirable since particles down to 0.45 micron, for example, can be removed with this type of vacuum filtration system. Major problems arise, however, with the conventional use of this system as it must be performed on a "batch" basis and then the filter will clog quickly with the separated matter in solution.

Summary of the invention

The instant invention is an apparatus which allows for high filtration with a Millipore filter on a continuous basis rather than a "batch" basis. The apparatus of the instant invention continuously removes the effluent from solutions of water and particles down to 0.45 micron by Millipore filtration but with the feed being blown tangentially across the filter so as to simultaneously supply the new mixture as well as washing the filter clean of any collected material on the surface. With this apparatus, high filtration with a Millipore filter can be achieved without the drawback of a "batch" operation or having the filter clogged.

The apparatus of the instant invention is constructed of a plexiglass box built around a standard Millipore filter head. The box has entrance and exit openings, the entrance opening having a nozzle mounted thereto which increases the velocity of and directs the incoming solution into a tangential flow pattern across the filter and which simultaneously supplies the new mixture to be filtered as well as washing the filter clean of any separated material clogged on it as a result of the vacuum filtration process. The Millipore filter paper is held in position in the box by three spring loaded shafts connected to the top of the box and by the vacuum from below in the vacuum suction flask. The top of the box is held in place by a plurality of screws with an O ring for an air tight fit and is easily removable for cleaning and filter service.

It is therefore an object of this invention to provide an apparatus for allowing a continuous high filtration with a Millipore filter.

It is a further object of this invention to provide an apparatus that allows for high filtration of particles having sizes of down to .45 micron.

It is a further object of this invention to provide an apparatus for continuous high filtration with a Millipore filter which is economical to produce and which utilizes conventional, currently available components that lend themselves to standard mass production manufacturing techniques.

For better understanding the present invention, together with other and further objects thereof, reference is had to the following description taken in connection with the accompanying drawing and its scope will be pointed out in the appended claims.

Description of the drawing

FIGURE 1 represents a perspective fragmentary view of the apparatus of this invention for continuous high filtration with a Millipore filter system; and FIGURE 2 represents a partial section along lines II—II of FIGURE 1.

Description of the preferred embodiment

Referring now to FIGURE 1, the Millipore filter system 10 is made up of a Millipore filter 12 mounted upon a filter head 14. The filter head 14 is in turn mounted on a vacuum suction flask 16 by means of any suitable mounting means such as rubber stopper 18. The filtered material flows into the suction flask 16 through tube 20 while the vacuum is being drawn through vacuum line 22 which is connected to any suitable vacuum source (not shown).

The apparatus 24 for continuous filtration with the Millipore filter 12 is made up of a box 25 constructed of any suitable material such as ½ inch Plexiglas and is held in place around the Millipore filter head 14 by any suitable air tight mount such as O rings 27 clamped in position by flange members 23 shown more clearly in FIGURE 2. As screws 29 are tightened flange members 23 squeeze O rings 27 to form an air tight mount about filter head 14. The box 25 is further made up of an entrance opening 26 and an exit opening 28, each located at opposite ends of the box, and each having a diameter of approximately ½ inch. An entrance pipe 34 and an exit pipe 35 are located in each of the openings 26 and 28, respectively, and are held in place by a suitable securing means such as internal nuts 31 and external nuts 33. Mounted on entrance pipe 34, inside the box 25 is a nozzle 30 being held thereon by any conventional mounting means such as nut 32. The nozzle itself measures approximately 1 inch by 1/16 inch, however, any other suitable dimensions may be used. The nozzle 30 is of a circular configuration adjacent the pipe 34 and tapers down to a rectangular slit adjacent filter 12. Furthermore, the nozzle 30 is bent so as to direct incoming solution into a tangential flow pattern with an increased velocity across the filter 12. A supply of the mixture to be filtered enters pipe 34 from a supply reservoir (not shown) and flows from nozzle 30 tangentially across filter 12 and out exit pipe 35. In this manner, the new mixture can be filtered as well as wash and filter 12 clean of any separated material clogged on it as a result of the vacuum filtration process.

The Millipore filter 12 is held in position on the filter head 14 by three spring loaded shafts 36. Although three shafts 36 are shown in the drawing any suitable number may be used. Furthermore, any suitable holding device may be substituted for the spring loaded shafts 36. In addition to being held in place by the spring loaded shafts 36 the filter 12 is held in place by the vacuum from below created in the vacuum suction flask 16. The top 38 of the box 25 is held in place by any suitable holding means such as a plurality of screws 40 and having a gasket 41 between the top and the bottom of the box for an air tight fit. By means of this arrangement, the top of the box 25 is removable for easy cleaning and filter service.

Mode of operation

Referring again to the drawing the apparatus 24 of the instant invention is mounted upon the filter head 14 of a Millipore filter system in the manner shown in the drawing. For optimum filtration results a vacuum of at least 5 mm. Hg is applied to the vacuum line 22. This seats the filter 12 properly and supplies the driving force for the vacuum filtration. The solution to be filtered is then pumped from its reservoir through the entrance pipe 34 at the rate of approximately one gallon per minute. The solution flows from the nozzle 30 at an increased velocity and in a tangential flow pattern across the filter 12. Effluent is filtered into the vacuum suction flask 16 through tube 20 at the rate of between 100 and 150 milliliters per hour depending on the solution and the age of the filter. The dewatered solution in the box 25 of the apparatus then leaves through the exit port 28 through exit pipe 35 and back to the reservoir for another pass through the invention. In this matter the apparatus of the instant invention simultaneously supplies a new mixture to be filtered as well as washes the filter clean of any separated material clogged on it as a result of the vacuum filtration process. Although dimensions are given throughout the specification for optimum results, it shoud be understood that any other suitable dimensions may be used.

Many potential uses exist for the apparatus of the instant invention, the primary one being its use in bacteriological and microbiological research for removing spent media from cultures or for concentrating the cultures on a continuous basis with high filtration efficiency. It can also find applications in water studies for clarifying liquids, dewatering solids, and separating suspended matter from water solutions. It can further find use in chemical research and process, waste treatment and water recovery research, and closed ecological systems study.

Although the invention has been described with reference to a particular embodiment, it will be understood to those skilled in the art that the invention is capable of a variety of alternative embodiments within the spirit and scope of the appended claims.

What is claimed is:

1. In a filter system having a vacuum suction flask, a filter head mounted on said flask and a filter mounted on said filter head, the improvement therein comprising an apparatus for providing continuous filtration with said filter, said apparatus comprising a box operatively positioned around said filter head, said filter being located within said box and being held securely in position on said filter head by a holding means attached to said box and by the vacuum created in said vacuum suction flask, said box having an entrance opening and an exit opening having entrance and exit pipes therein, respectively, and a nozzle mounted on said entrance pipe in said box in an operative position proximate said filter so positioned that a fluid entering said entrance opening flows from said nozzle in a tangential flow pattern with increased velocity across said filter and out said exit opening so as to simultaneously supply a new mixture to be filtered as well as washing the filter clean of any collected material on the surface.

2. In a filter system as defined in claim 1 wherein said nozzle is of a circular configuration adjacent said entrance pipe and tapers down to a rectangular slit adjacent said filter, said nozzle being bent in such a manner as to direct the fluid into a tangential flow pattern with an increased velocity across said filter.

3. In a filter system as defined in claim 2 wherein said holding means comprises a plurality of spring loaded shafts bearing against said filter.

4. In a filter system as defined in claim 3 wherein said box has a removable top.

5. In a filter system as defined in claim 4 wherein said box is constructed of ½ inch Plexiglas.

References Cited

UNITED STATES PATENTS

| | | | |
|---|---|---|---|
| 1,472,896 | 11/1923 | Alsop | 210—406 |
| 3,400,575 | 9/1968 | Madden | 210—433 X |

REUBEN FRIEDMAN, Primary Examiner

J. W. ADEE, Assistant Examiner

U.S. Cl. X.R.

210—433